United States Patent [19]

Koga et al.

[11] Patent Number: 4,658,057
[45] Date of Patent: * Apr. 14, 1987

[54] EXTRACTION METHOD

[75] Inventors: Kunio Koga; Yukihiro Sasaki; Hirotoshi Niwa, all of Himeji, Japan

[73] Assignee: Daicel Chemical Industries, Ltd., Sakai, Japan

[*] Notice: The portion of the term of this patent subsequent to Dec. 31, 2002 has been disclaimed.

[21] Appl. No.: 576,284

[22] PCT Filed: Jul. 12, 1983

[86] PCT No.: PCT/JP83/00223
§ 371 Date: Jan. 10, 1984
§ 102(e) Date: Jan. 10, 1984

[87] PCT Pub. No.: WO84/00309
PCT Pub. Date: Feb. 2, 1984

[30] Foreign Application Priority Data
Jul. 13, 1982 [JP] Japan .................. 57-121425

[51] Int. Cl.$^4$ .................... C07B 51/42
[52] U.S. Cl. .................... 562/608; 562/513; 562/600; 422/259; 423/658.5
[58] Field of Search .......... 422/258, 259, 234; 423/658.5, 281; 562/513, 608, 600; 210/634

[56] References Cited

U.S. PATENT DOCUMENTS

| | | | |
|---|---|---|---|
| 1,839,894 | 1/1932 | Ricard et al. | 562/608 |
| 1,860,553 | 5/1932 | Ricard et al. | 260/705 |
| 2,357,344 | 9/1944 | Morris et al. | 260/705 |
| 3,966,594 | 6/1976 | Ohkawa et al. | 210/638 |
| 4,018,869 | 4/1977 | Beltz et al. | 423/321 |
| 4,039,404 | 8/1977 | Richards et al. | 204/106 |
| 4,353,784 | 10/1982 | Koga et al. | 203/16 |

OTHER PUBLICATIONS

CA90:154097g "Study, of the Dimensional Distribution of Drops in 'Water in Oil' Emulsions in a Box-Type Mixing Settling Extractor", Nezhdanov, A. A., 1977.
CA92:13162m "Solvent Properties of Organic Bases for Extraction of Acid From Water", Ricker, N. L., 1979.
CA:37298v "Solvent Extraction with Amines for Recovery of Acetic Acid From Dilute Aqueous Industrial Stream", Ricker, N. L., 1980.

Primary Examiner—David L. Lacey
Attorney, Agent, or Firm—Flynn, Thiel, Boutell & Tanis

[57] ABSTRACT

In extracting a solute from an aqueous solution using a mixer-settler extractor and an organic extractant comprising a mixture of a tertiary amine and an organic diluent, the extractor is operated while the liquid phase inside the mixer thereof is kept in a state of solvent dispersion. Thus, the mixer-settler extractor can be operated efficiently.

7 Claims, 2 Drawing Figures

EXTRACTION METHOD

TECHNICAL FIELD

This invention relates to an extraction method in which a mixer-settler extractor is efficiently operated in extracting a solute from an aqueous solution using an organic extractant containing a tertiary amine.

BACKGROUND ART

In comparison with a tower extractor, a mixer-settler extractor is disadvantageous in that it is generally more expensive to install and the system has a greater quantity of hold-up. In carrying out an extraction operation with a smaller number of stages, however, the installation cost becomes lower, on the contrary, and the mixer-settler extractor provides quite excellent advantages for a system in which the extraction speed is low, one in which the difference in viscosities is great between oil and water and one contaminated with impurities. In a method of extracting a solute from an aqueous solution using an organic extractant consisting of a tertiary amine and an organic diluent, the viscosity of the extractant is high and, in addition the speed of the solute transfer is low, so that a tower extractor not provided with a mobile part, as represented by a perforated plate tower and a packed tower, is not generally employed. In other words, the actual height per theoretical stage becomes extremely high in these types of extractors and hence, an extractor having an extremely large tower height becomes necessary. Moreover, the operating range is narrow in order to prevent flooding and the column diameter of the tower becomes uneconomically large.

In carrying out the extraction efficiently using an organic extractant system containing a tertiary amine, therefore, it is more advantageous to use an extractor which is designed to increase the dispersion coalescence frequency of droplets, such as a mixer-settler extractor.

The problem encountered in operating a mixer-settler extractor in this system is liquid separation in the settler. If the stirring power is increased so as to improve the extraction efficiency in the mixer, the solution becomes an emulsion or reaches a state analogous to an emulsion, so that an extended period of time is necessary for the liquid separation in the settler. This results in the necessity of using an extremely large settler, with consequent increase in the quantity of hold-up and increase in the installation cost and in the quantity of initial liquid charge.

To improve the liquid separation, various methods have been employed. For example, the extraction temperature is raised or the stirring condition in the mixer is optimized to prevent the occurrence of undesirable fine droplets and to steepen the distribution of droplets diameters. Alternatively, a recycle pump is disposed between the mixer and the settler of each stage and recycles the solvent phase or the water phase so as to keep the phase ratio (of the solvent phase to the water phase) inside the mixer at an appropriate level. A method of elevating the separation speed of two liquids by adding an additive such as an alcohol, an alkali metal salt or an alkaline earth metal salt (see the Japanese Patent Publication No. 36209/1974) and an electrical method which is generally employed in a demelter of an oil refinery have also been applied with certain successes. However, the effects brought forth by these methods are not entirely satisfactory in the system to which the prevent invention is directed.

DISCLOSURE OF INVENTION

The inventors of the present invention have carried out intensive studies on the liquid separability in the settler in recovering a solute in an aqueous solution using a mixer-settler extractor and an organic extractant comprising a mixture of a tertiary amine and an organic diluent and have found that the greatest factor in improving the liquid separation speed is one other than the general, well-known ones described above, that is, maintaining the organic extractant (solvent) phase as the dispersed phase inside the mixer, or operating the mixer while the liquid phase in the mixer is kept in a state of a solvent dispersion. The present invention is based on this finding.

Thus, the present invention relates to a method of extracting a solute from an aqueous solution using an organic extractant comprising a mixture of a tertiary amine and an organic diluent in a mixer-settler extractor, characterized in that the extractor is operated while the organic extractant phase inside the mixer is the dispersed phase and the aqueous solution is the continuous phase of a dispersion.

According to the observation of the inventors of the present invention, when the operation is effected with the water phase as the dispersed phase in the mixer (that is, in the case of a water dispersion), the liquid separation in the settler is effected in such a manner that water droplets in the organic extractant phase fall down by gravity against an upward flow of the continuous organic extractant phase. This situation is generally given by Stokes' formula or the like and the quantity of the water phase entrained by the organic extractant phase can be determined by this formula. Generally, the droplets generated inside the mixer are liable to exhibit a relatively wide diameter distribution, though depending upon the stirring condition of the mixer, so that fine water droplets are unavoidably entrained by the organic extractant phase and the liquid separation inside the mixer becomes insufficient, resulting in a poor extraction efficiency. Accordingly, it is important to narrow the diameter distribution of the dispersed droplets inside the mixer and yet to keep a large average diameter of the droplets, in order to improve the liquid separation efficiency inside the settler. This also holds true exactly of the case where the extractor is operated in the state of a organic extractant dispersion with the solvent phase being present as the dispersed phase inside the mixer. The present inventors have found that the speed of aggregation and coalescence of the droplets varies remarkably even under the stirring condition of the mixer which provides the same droplet diameter distribution, depending upon whether the dispersed phase is either the water phase or the organic extractant phase.

The present inventors have carried out quantitative examination of the liquid separation behavior after stopping the stirring using a mixer and have found that the liquid separation speed could be more drastically improved by the solvent dispersion than by the water dispersion under the condition where the stage efficiency at one mixer-settler stage is kept virtually at 100%. Selection of the dispersed systems has often been considered in the past from the aspect of mass transfer. It has not been known at all to this date to select the dispersed systems in view of the liquid separability in the settler as in the present invention.

In the stirring operation of heterogeneous liquid-liquid systems in general, determination of the dispersed system inside the mixer is governed by the proportion of volumes of the liquids inside the mixer. In the case of a water phase and an organic extractant phase, this can be divided into three ranges as schematically depicted in FIG. 1.

Figure 1:
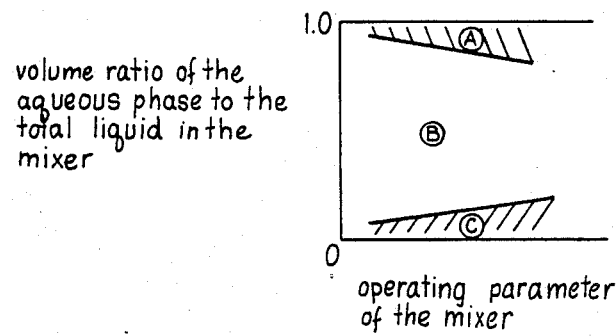
FIG. 1 is a diagram schematically showing the range of dispersion inside a mixer.

In FIG. 1, the ordinate represents the ratio of the volume of the water phase to the total volume of the liquids inside the mixer and the abscissa represents the operating parameter of a mixer, such as the number of revolutions for stirring or the temperature. The dispersed phase in each of regions (A), (B) and (C) is as follows:

Region (A):

The quantity of the water phase is greater than that of the organic extractant. In this case, the organic extractant phase serves as the dispersed phase inside the mixer whereas the water phase can not.

Region (C):

The quantity of the water phase is smaller than that of the organic extractant phase. In this case, the water phase serves as the dispersed phase inside the mixer whereas the organic extractant phase can not.

Region (B):

The relation of the quantities between the water phase and the organic extractant phase is in between cases (A) and (C). In this case, the water phase can serve as either the dispersed phase or the continuous phase. The organic extractant phase can also serve as the dispersed phase or the continuous phase.

Generally, the liquid inside the mixer of a mixer-settler extractor is mostly operated in region (B), so that the organic extractant phase can serve as the dispersed phase or the water phase can serve as the dispersed phase. The boundary between regions (A) and (B) can be determined by the steps of charging first the organic extractant into the mixer, adding gradually the aqueous solution at a constant revolution speed and a predetermined temperature where complete mixing is attained, stopping the addition and stirring of the aqueous solution when the water phase is replaced by the organic extractant phase serving as the dispersed phase, and measuring the proportion of the water phase inside the mixer. The boundary between regions (B) and (C) can be determined by the steps of charging first the aqueous solution into the mixer, then adding gradually the organic extractant under the same condition as described above and measuring the proportion of the organic extractant phase when the organic extractant phase is replaced by the water phase serving as the dispersion phase.

As can be understood from the above description, a solvent dispersion can be attained in the system of the present invention by charging in advance the aqueous solution into the mixer and then adding the mixed organic extractant consisting of a tertiary amine and an organic diluent with stirring. Alternatively, the mixer is half filled with water and then the aqueous solution and the organic extractant are charged therein. In his case, it is advisable to charge initially water into the settler. The operation is carried out so that the proportion of quantities of the water phase and the organic extractant phase inside the mixer falls within the region (B) in FIG. 1.

The method of the present invention is useful for extracting and recovering an acid such as acetic acid, acrylic acid, or nitric acid from an aqueous acidic solution using an organic extractant consisting of a tertiary amine and an organic diluent. The present method is effective when applied to an aqueous acid solution having an acid concentration of up to 50 wt %.

The method of the present invention is particularly effective for recovering acetic acid from an aqueous acetic acid solution using an organic extractant consisting of a tertiary amine and an organic diluent. In other words, acetic acid is extracted from the aqueous solution using a mixer-settler extractor and a tertiary amine such as tri-n-octyl amine (TOA) in combination with an organic diluent comprising an oxygen-containing organic solvent such as 3,3,5-trimethylcyclohexanone (TMCH) as the organic extractant (whereby the amine and the solvent have boiling points higher than that of acetic acid).

The tertiary amines to be used are preferably those having a boiling point higher than that of acetic acid and form a non-aqueous phase. The number of carbon atoms contained in the tertiary amine should be around 12 to 40, considering the low solubility in the water phase and the separability from acetic acid by distillation. It is also preferable in order to obtain a large apparent distribution coefficient that the tertiary amine has no larger branches near the nitrogen atom. It is undesirable to have an ethyl or larger substituent group on a carbon atom adjacent to the nitrogen atom or spaced from the nitrogen atom by one $CH_2$ group.

It is also to be avoided to have a benzyl group or those having a cyclic structure near the nitrogen atom. In other words, the tertiary amines should be selected, from those which have a partial structure represented by $>N—CH_2—CR^1R^2$, wherein $R^1$ is a hydrogen atom and $R^2$ is a hydrogen atom or a methyl group, for example, $C_6$ or higher trialkylamines such as trihexylamine, trioctylamine, triisooctylamine (tris-2,4,4-trimethylpentylamine), trilaurylamine, dimethyllaurylamine, dimethylhexadecylamine, methyldi(tridecyl)amine, or dimethyldecylamine; tertiary amines having an alkenyl group such as dimethyloleylamine or butylbis(5,5,7,7-tetramethyloct-2-en-1-yl)amine (XE-204); or tertiary amine mixtures such as dimethylcocoamine, dimethyl(-$C_{8-12}$alkyl)amines, or dimethyl(hydrogenated tallow)amine. Commercially available tertiary amines can be used as such. It is also possible to obtain tertiary amines by alkylating primary or secondary amines available as intermediates by a known method. Among many usable tertiary amines mentioned above, TOA is readily available and shows an excellent apparent distribution coefficient when it is admixed with an oxygen-containing organic solvent to form an extractant.

Examples of the organic solvent to be used in combination with the amines are those oxygen-containing organic solvents which have a boiling point higher than acetic acid, e.g. ketones, alcohols, carboxylic esters, or phosphoric esters. When these solvents are used in combination with the tertiary amines described above, acetic acid in the aqueous solution can be extracted with a particularly large apparent distribution coefficient.

EXAMPLE 1

Figure 2:
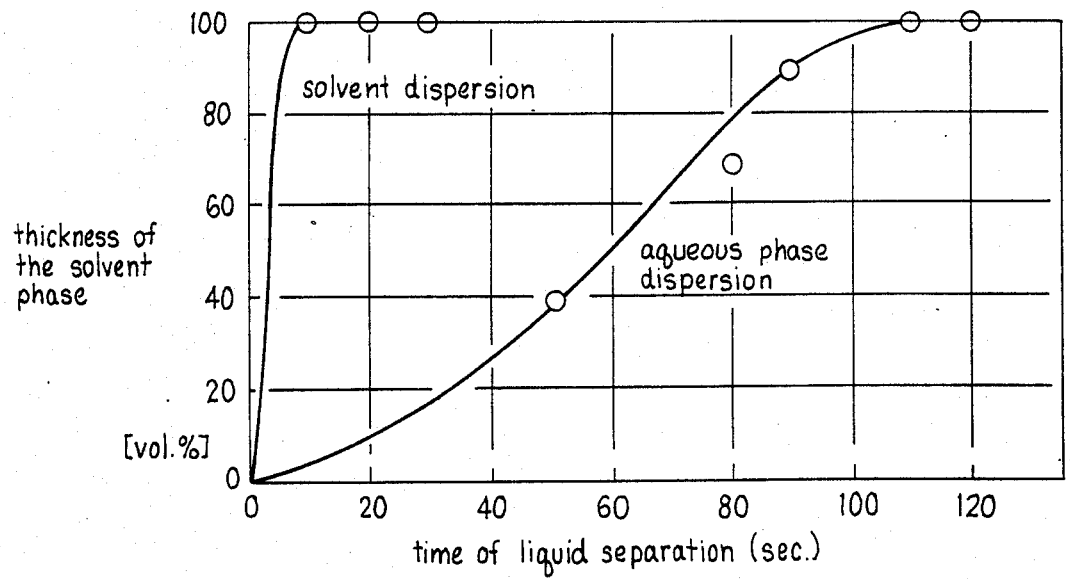
FIG. 2 is a diagram showing liquid separation speeds in an embodiment of this invention and in a comparative example.

150 cc of a 1 wt % aqueous acetic acid solution was charged in advance into a mixer consisting of a separable glass flask having an inner diameter of 75 mm and a height of 75 mm and pitched paddles (four) having an agitation blade length of 40 mm and a width of 8 mm. While the aqueous solution was being stirred at 700 r.p.m., 150 cc of a mixed organic extractant (50:50 volume ratio) consisting of a tertiary amine (TOA) and an organic diluent (TMCH) was added portionwise to allow the mixed organic extractant to serve as the dispersed phase. In this case, confirmation was made with naked eye that the organic extractant served as the dispersed phase. After stirring and mixing were effected at the same revolution speed for 10 minutes, stirring was stopped and the relation between the ratio of volumes of the clear water phase and the organic extractant phase to the total volume and the time was measured. Here, the temperature was controlled to 30° C. The result is shown by solvent dispersion line in FIG. 2. As can be seen from this diagram, complete liquid separation could be attained after about 10 seconds.

COMPARATIVE EXAMPLE 1

150 cc of the mixed organic extractant consisting of the same tertiary amine and the same organic diluent as those used in Example 1 was charged in advance into the same apparatus as used in Example 1. While the mixture was being stirred at 700 r.p.m., 150 cc of a 1 wt % aqueous acetic acid solution was added portionwise to permit the 1 wt % aqueous acetic acid solution to serve as the dispersed phase. After stirring and mixing were effected for the same period of time, stirring was stopped to carry out the same measurement. The temperature was also controlled to the same temperature as above. The result is shown by the aqueous phase dispersion line in FIG. 2. As can be seen from this diagram, about 110 seconds of time was necessary for attaining complete liquid separation and the separation speed was remarkably lower than that of the solvent dispersion.

What is claimed is:

1. A method of recovering a solute from an aqueous solution thereof, comprising the steps of: feeding into a mixer of a mixer-settler extraction system
   (1) said aqueous solution, and
   (2) a liquid organic extracting agent capable of extracting said solute from said aqueous solution,
   and mixing said aqueous solution and said extracting agent in said mixer so as to form a dispersion in which the disperse phase is droplets of said extracting agent which droplets are dispersed in a continuous phase of said aqueous solution, whereby the solute is extracted from said aqueous solution and is transferred to said extracting agent, the volumetric ratio of the aqueous solution (1) to the total liquids in said mixer being at a level effective to maintain said dispersion in a stable condition in said mixer; then, in the settler of said extraction system, allowing said dispersion to settle whereby to obtain separately (i) an aqueous phase and (ii) a liquid organic extracting agent phase containing the solute.

2. A method as claimed in claim 1 in which, before said extracting agent is fed into said mixer, said mixer is partially filled with said aqueous solution and then the remainder of said aqueous solution and said liquid organic extracting agent are fed into said mixer.

3. A method as claimed in claim 1 in which, before said extracting agent is fed to said mixer, the entirety of said aqueous solution is placed in said mixer and then said liquid organic extracting agent is fed into said mixer.

4. A method as claimed in claim 1 in which the solute is acetic acid and the liquid organic extracting agent comprises a tertiary amine having a boiling point higher than the boiling point of acetic acid.

5. A method as claimed in claim 4 in which the acid concentration of said aqueous solution of acetic acid is not more than 50% by weight.

6. A method as claimed in claim 4 in which said liquid organic extracting agent consists essentially of said tertiary amine and an oxygen-containing organic material having a boiling point higher than the boiling point of acetic acid.

7. A method as claimed in claim 4 in which said liquid organic extracting agent consists essentially of tri-n-octylamine and 3,3,5-trimethylcyclohexanone.

* * * * *